Oct. 17, 1950     G. W. LA SALLE     2,526,242

FAN DRIVE

Filed June 4, 1945     5 Sheets-Sheet 1

Inventor
By George W. La Salle
Frease and Bishop
Attorneys

Inventor
George W. La Salle
By Frease and Bishop
Attorneys

Patented Oct. 17, 1950

2,526,242

UNITED STATES PATENT OFFICE 2,526,242

FAN DRIVE

George W. La Salle, Canton, Ohio, assignor to Hercules Motors Corporation, Canton, Ohio, a corporation of Ohio Application June 4, 1945, Serial No. 597,484

8 Claims. (Cl. 74—242.16)

The invention relates to apparatus for driving or transmitting power to accessories of internal combustion engines; and more particularly to a drive mechanism for two or more accessories, such as a fan, and a compressor or a generator, and the like, and to adjusting means for the drive mechanism.

There has always been considerable difficulty in providing satisfactory drives for accessories for internal combustion engines. Where two or more accessories are driven from the crankshaft of an engine, the location of the accessory shafts, and the distribution of the load, have complicated the problem particularly when belt drives are used.

Frequently, a fan shaft and a compressor shaft are driven from an engine crankshaft by a single belt, commonly called a three-point drive, in which the belt travels in a generally triangular path around three pulleys on the three shafts. A three-point drive is not entirely satisfactory because the arc of belt contact with the crankshaft pulley is insufficient to adequately transmit the necessary power from the crankshaft for driving the fan and compressor shafts. Likewise, the arc of belt contact of the three-point drive on the fan shaft pulley is usually very small, yet the fan shaft load may be bigger than the compressor shaft load whose pulley has a greater arc of contact with the single belt.

Assuming that the normal stretch in a belt is say 3%, and that a belt for a three-point drive for a large engine may be as much as 50" long, an adjustment must be provided for taking up a belt stretch of 1½" by relative movement of one or more of the shafts away from one or another of the shafts. Such an adjustment has usually been provided on the fan pulley. In addition to normal stretch in a belt, belt wear may require an equivalent amount of adjustment or a total adjustment of 3" for a 50" belt. Adjustments of such magnitude on large engines are out of the question, particularly if the fan is enclosed by a shroud which is necessary in high-speed engines in order to move the required amount of air for cooling.

Collapsible groove pulleys have frequently been used as a means of adjustment for belt stretch and wear; but drives including collapsible groove pulleys are not satisfactory because adjustment of such pulleys changes the location of the center plane of the belt at the collapsible groove pulley, which results in additional wear on the belt.

Attempts have been made to correct some of these difficulties by using a two-belt drive in which one belt connects the crankshaft with say the fan shaft, and a second belt connects the fan shaft with a compressor shaft. In this arrangement, each belt is shorter so that less stretch is involved and less adjustment is required for each belt. Moreover, an adjustment for one belt in a direction lying in a plane common to the axes of the two shafts connected by the belt, simultaneously takes up both flights of the belt so that a 1" adjustment would take up 2" of belt stretch.

However, such a two-belt arrangement has heretofore required two adjustments, one for each belt; either two adjustments on one shaft, or one adjustment on each of two shafts. Sometimes, one of the adjustments, if the accessory is for instance a generator, is provided by moving the entire generator support.

However, such two-belt drives are not desirable because of the necessity of providing mechanism for making two adjustments, because of the necessity of performing two adjusting operations, and because of the difficulty of maintaining uniform tension on both belts where two adjustments are involved.

Accordingly, the described prior art belt drives have never been completely satisfactory and a problem has existed in the art for which there has been no solution, particularly in large-sized, high-speed engines where long length belts are required to transmit relatively heavy loads with a minimum movement of the shafts for providing for necessary adjustment for belt stretch and wear.

I have discovered that the problem may be solved and the difficulties overcome by providing a single adjustment requiring minimum movement of one of the shafts connected by two belts respectively with two other shafts.

Accordingly, it is a primary object of the present invention to provide an improved adjusting mechanism for the belt drive for accessories for internal combustion engines.

Also, it is an object of the present invention to provide an improved belt drive for two or more accessory shafts from a third shaft of an engine.

Likewise, it is an object of the present invention to provide a two-belt drive for accessories for an internal combustion engine with a single adjusting mechanism which simultaneously takes up both belts by a single adjusting operation.

Moreover, it is an object of the present invention to provide an improved belt drive for an internal combustion engine in which a single adjustment is utilized for simultaneously taking up two belts of a two-belt drive in an equalized manner.

Also, it is an object of the present invention to provide an improved belt drive for the fan and at least one other accessory of an internal combustion engine in which a large arc of contact is maintained between the belts and pulleys whereby the necessary power may be transmitted to take care of the respective loads on the driven shafts.

Furthermore, it is an object of the present invention to provide an improved belt drive for the fan and at least one other accessory for an internal combustion engine in which a single adjustment for both belts of a two-belt drive may be made on the fan shaft within the necessary limitations of fan shaft movement established by a shroud cooperating therewith and required for moving a large volume of air for cooling high-speed engines.

Moreover, it is an object of the present invention to avoid the use of collapsible groove pulleys for fan drives for internal combustion engines and to avoid excessive belt wear caused by the use of such pulleys.

Also, it is an object of the present invention to provide an adjustment mechanism for the fan shaft of a two-belt drive for an internal combustion engine having few parts of simple design which may be readily installed and quickly and reliably adjusted.

Finally, it is an object of the present invention to provide a new fan drive construction for an internal combustion engine that solves a problem which has existed in the art for many years, which eliminates the foregoing difficulties, which incorporates the foregoing desiderata, and which is simple and reliable in construction and operation.

These and other objects and advantages apparent to those skilled in the art from the following description and claims may be obtained, the stated results achieved, and the described difficulties overcome, by the devices, constructions, arrangements, combinations, sub-combinations, parts, elements, discoveries and principles which comprise the present invention, the nature of which is set forth in the following general statement, a preferred embodiment of which—illustrative of the best mode in which applicant has contemplated applying the principle—is set forth in the following description and shown in the drawings, and which is particularly and distinctly pointed out and set forth in the appended claims forming part hereof.

The nature of the improvements in fan drives of the present invention may be stated in general terms as preferably including a drive shaft, such as the crankshaft of an internal combustion engine; a plurality of driven shafts, such as a fan shaft and a compressor shaft, comprising shafts of accessories for the internal combustion engines; pulleys on said shafts, belt means extending between the drive shaft pulley and one of the driven shaft pulleys; other belt means extending between the two driven shaft pulleys; and adjusting mechanism for the first-named driven shaft including a stub shaft connected eccentrically with said first-named driven shaft, bracket member means on the engine, yoke member means adjustably mounted on the bracket member means, and means slidably and rotatably mounting the stub shaft on one of the members and rotatably mounting the stub shaft on the other member whereby wear or stretch of either or both belt means may be compensated for with a minimum shifting of the axis of the first-named driven shaft pulley.

By way of example, a preferred embodiment of the improved fan drive for internal combustion engines is illustrated in the accompanying drawings forming part hereof wherein.

Similar numerals refer to similar parts throughout the various figures of the drawings.

Figure 1:
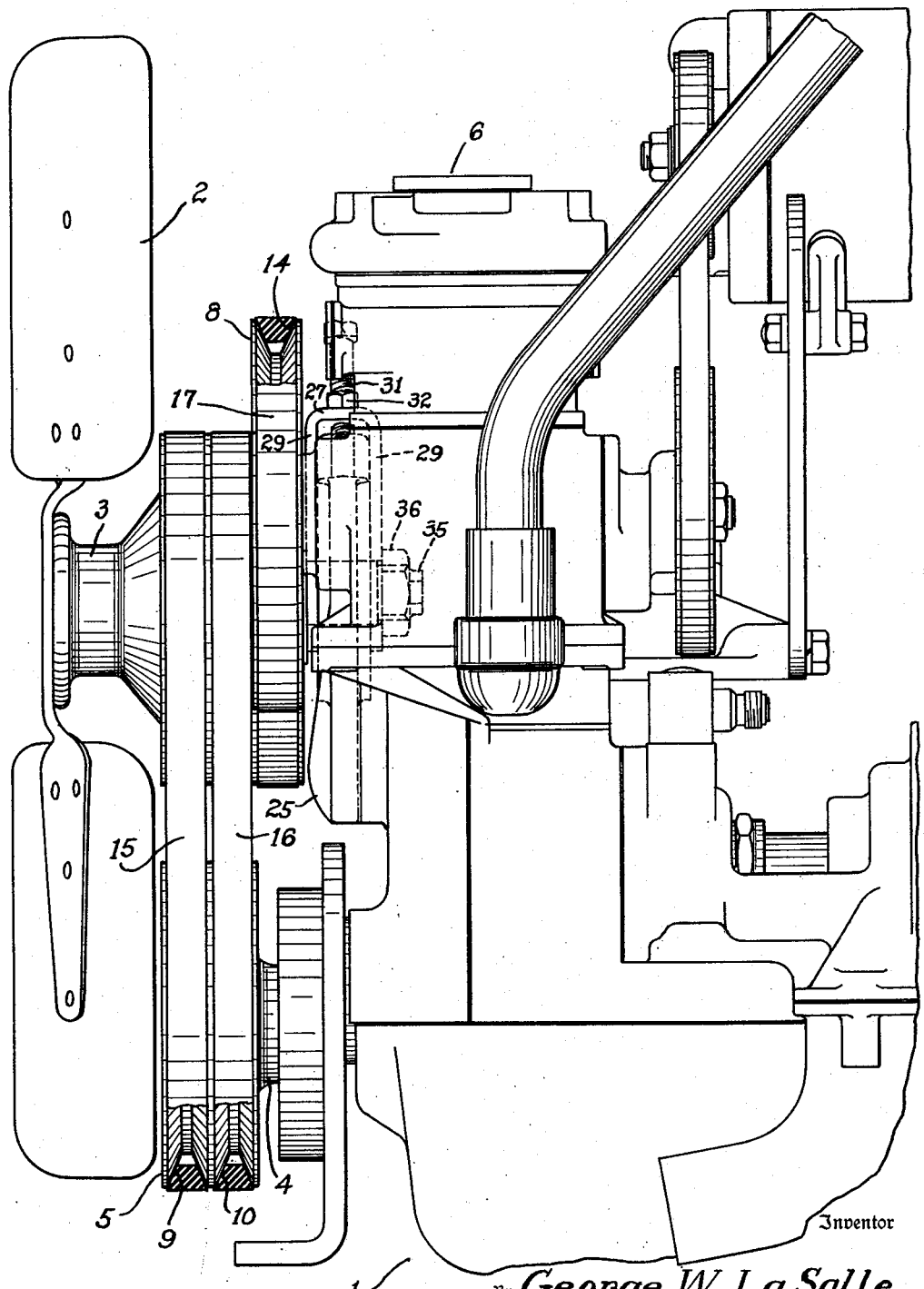
Figure 1 is a side elevation of a portion of an internal combustion engine illustrating the improved fan drive.
Figure 2:
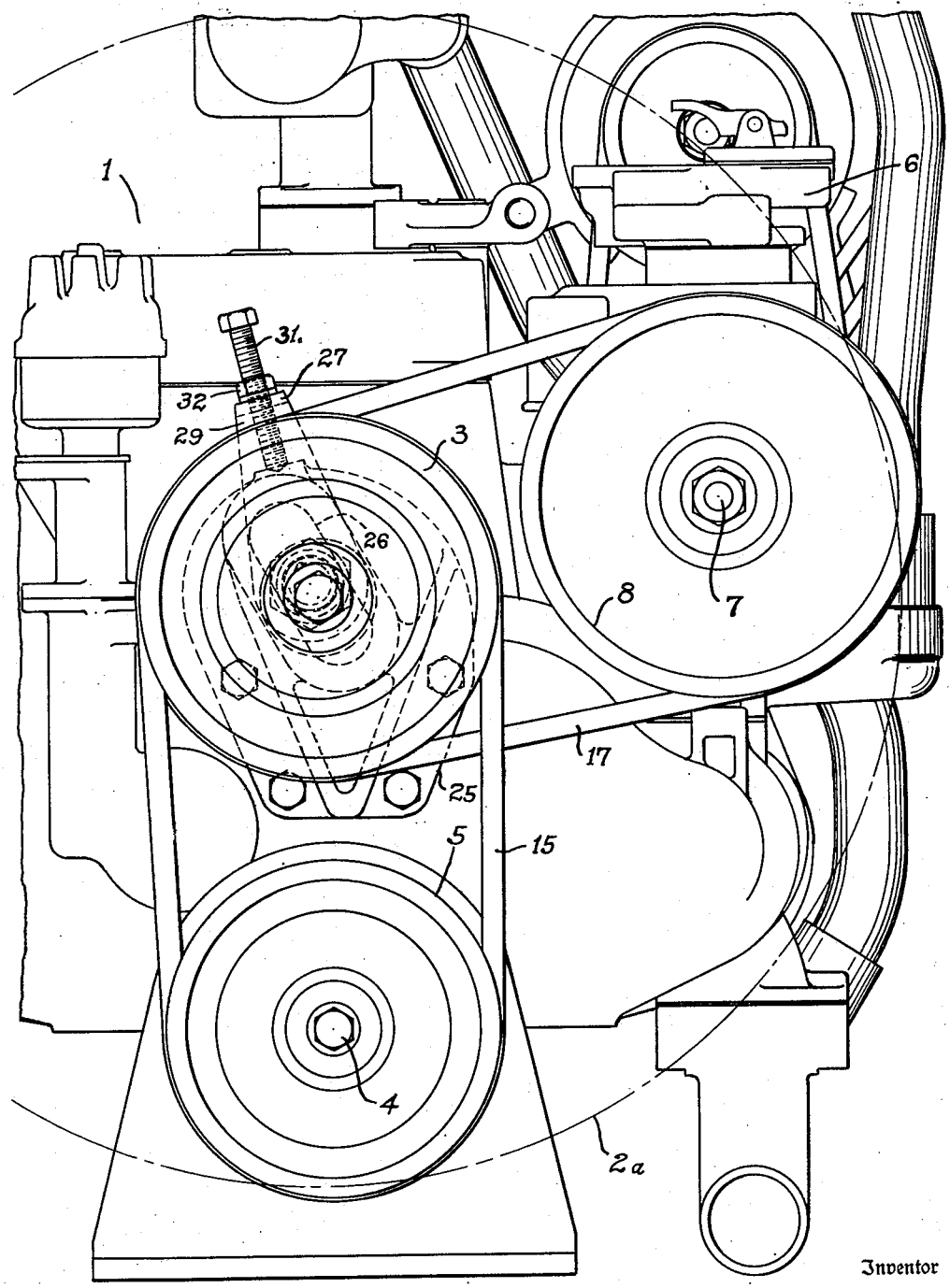
Fig. 2 is a fragmentary end view of certain of the parts illustrated in Fig. 1.

An internal engine is indicated generally at 1 in Figs. 1 and 2 having a fan 2 mounted on one end of a fan pulley generally indicated at 3, a crankshaft 4 having a crankshaft pulley generally indicated at 5, and a compressor 6 having a compressor shaft 7 provided with a compressor shaft pulley 8. The path of fan 2 is generally indicated by the dot-dash circle 2a in Fig. 2.

The pulleys 3, 5 and 8 are preferably V-groove pulleys connected by V-belts. The crankshaft pulley 5 preferably has two V-grooves 9 and 10; the fan shaft pulley 3 preferably has three V-grooves 11, 12 and 13; and the compressor shaft pulley 8 preferably has one V-groove 14. Two V-belts 15 and 16 in parallel, respectively connect the grooves 9 and 10 of crankshaft pulley 5 with the grooves 11 and 12 of fan pulley 3; and another V-belt 17 connects the third groove 13 of fan pulley 3 with the single groove 14 of compressor shaft pulley 8.

Thus, the arc of contact between each belt 15, 16 and 17 and each pulley engaged thereby is substantially semi-circular whereby a maximum amount of power may be transmitted by the belt drive. Moreover, the two belts 15 and 16 are in parallel between the driving crankshaft pulley 5 and the driven fan pulley 3 and can therefore adequately drive the heavy fan shaft load and the relatively lighter compressor shaft load which is driven by the crankshaft through the fan shaft.

Figure 3:
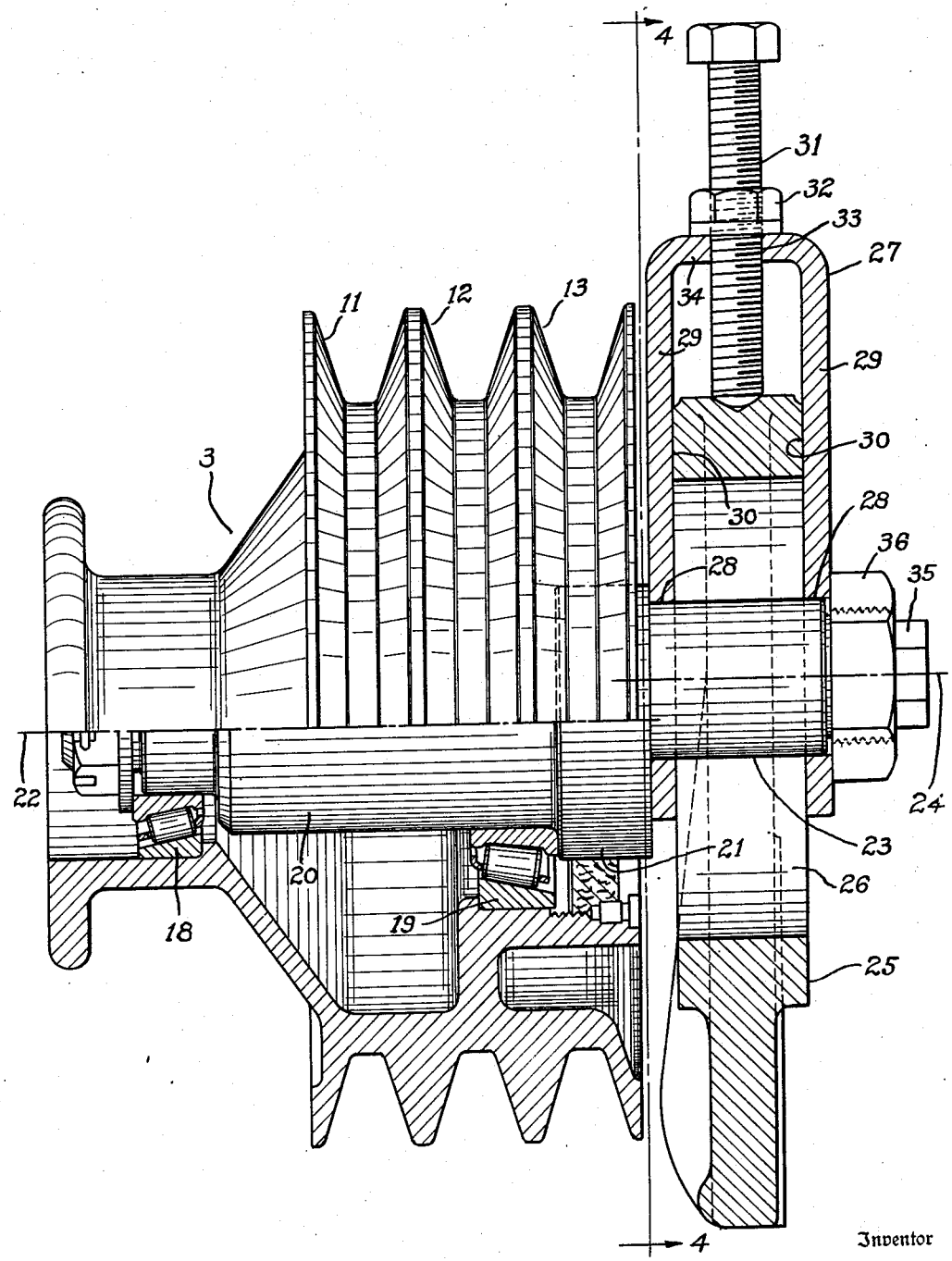
Fig. 3 is an enlarged side elevation of the adjusting mechanism for the fan drive pulley of the belt drive shown in Figs. 1 and 2, with certain parts in section taken as on the line 3—3, Fig. 4.
Figure 4:
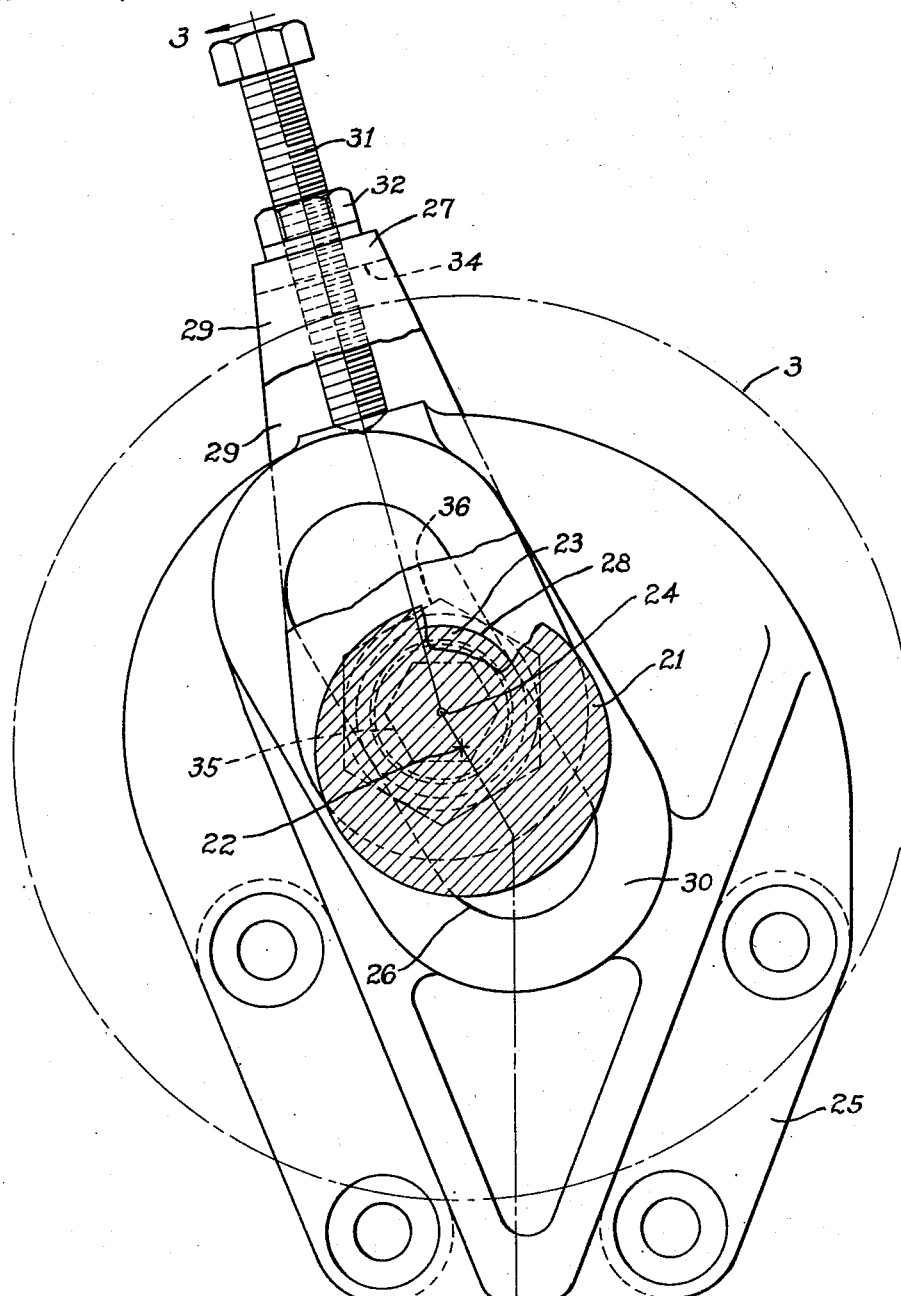
Fig. 4 is a sectional view looking in the direction of the arrows 4—4, Fig. 3.

Referring more particularly to Figs. 3 and 4, the fan pulley 3 is preferably journaled by bearings 18 and 19 upon fan shaft 20 having an enlarged portion 21. The axis of the fan shaft 20 and enlarged portion 21 upon which fan pulley 3 is journaled, is indicated by numeral 22 running to a cross (+) in Figs. 4, 7, 8, 9 and 10 and by the dot-dash line 22 in Fig. 3.

A stub shaft or spindle 23 projects from the enlarged portion 21 of the fan shaft 20, rearward of the pulley 3, and its axis 24 is eccentric to the axis 22 of the fan shaft. The axis 24 of the stub shaft or spindle is indicated by the numeral 24 running to a small circle (o) in Figs. 4, 7, 8, 9 and 10 and by the dot-dash line 24 in Fig. 3.

A bracket member 25 is mounted on the engine 1 and is provided with an elongated slot 26 within which stub shaft 23 is both slidable and rotatable. As shown in Figs. 2 and 4, the center line of the slot 26 is tilted at an angle, not only with respect to a plane passing through the axes of the crankshaft 4 and fan shaft 20; but also with respect to a plane passing through axes of the fan shaft 20 and compressor shaft 7.

A U-shaped yoke-like member 27 journals the stub shaft 23 in openings 28 provided in the legs 29 thereof; and the legs 29 are located on each side of and are slidable with respect to the opposite faces 30 of the bracket member 25 surrounding the slot 26.

An adjusting screw 31 provided with a lock nut 32 is threaded at 33 through the base 34 of the U of the yoke 27 whereby the yoke 27 may be adjusted relative to the bracket member 25. Referring to Figs. 2 and 4, the center line of the adjusting screw is angled with respect to the center line of the slot 26 in bracket 25.

The inner end of the stub shaft 23 is preferably provided with a wrench-receiving formation 35 and a lock nut 36 is threaded onto stub shaft 23.

The yoke 27 may be adjusted by adjusting the screw 31 relative to fixed bracket member 25 thereby moving stub shaft 23 in one direction or another along slot 26 while permitting rotation of stub shaft 23 during adjustment, both in slot 26 and in journals 28. When the necessary adjustment is made, lock nut 36 on the end of stub shaft 23 may be tightened to rigidly clamp stub shaft 23, yoke 27 and bracket member 25 together.

When belts 15, 16 and 17 are installed or when it is necessary to make an adjustment for stretch or wear of said belts, nut 36 is loosened to permit stub shaft 23 to freely rotate in slot 26 and journals 28. Adjusting screw 31 is then tightened to raise yoke 27. The eccentricity between stub shaft 23 and fan shaft 20 permits fan shaft 20 to adjust itself to a position providing uniform tension on all belts 15, 16 and 17; it of course being understood that belts 15 and 16 which act in parallel should have the same length. If tight fits of the parts resist automatic rotation of stub shaft 23 to provide uniform tension, stub shaft 23 may be rotated by applying a wrench to wrench-receiving portion 35. The adjusting screw 31 is then locked and the nut 36 tightened to hold the parts in adjusted position. Thus, the substantially automatic, uniform tensioning of the belts when the drive is adjusted is accomplished because of the eccentricity between shafts 20 and 23, and the angled relationship of slot 26 in bracket member 25.

Figure 5:
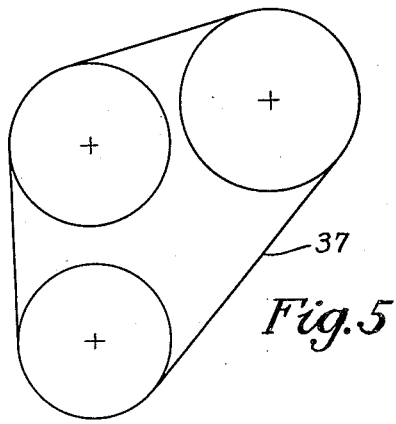
Fig. 5 is a diagrammatic view of a three-point belt drive.

Referring to Fig. 5, a usual type of three-point drive is illustrated in which adjustment for belt wear or stretch in belt 37 requires an excessively large movement of one of the pulley shafts away from one or more of the other pulley shafts. Also, the arc of contact for transmitting the drive is shorter on each pulley than in the present drive illustrated diagrammatically in Figs. 7, 8, 9 and 10.

Figure 6:
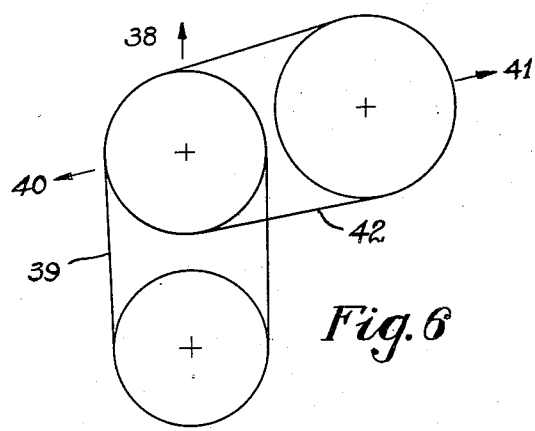
Fig. 6 is a diagrammatic view of an ordinary two-belt drive.
Figure 7:
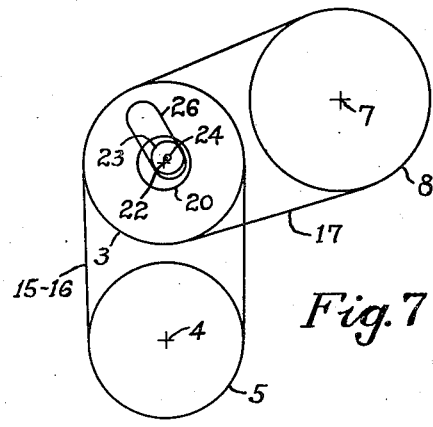
Figs. 7, 8, 9 and 10 are diagrammatic views illustrating various positions of adjustment of the improved fan drive of the present invention.
Figure 8:
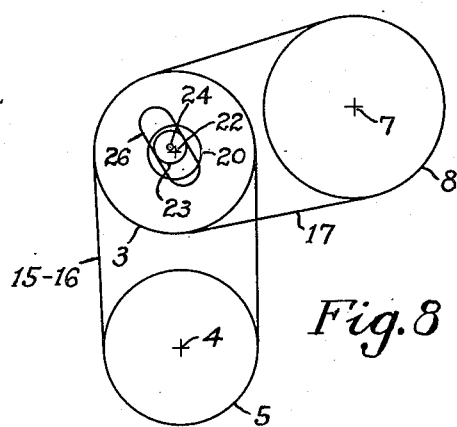
Figure 9:
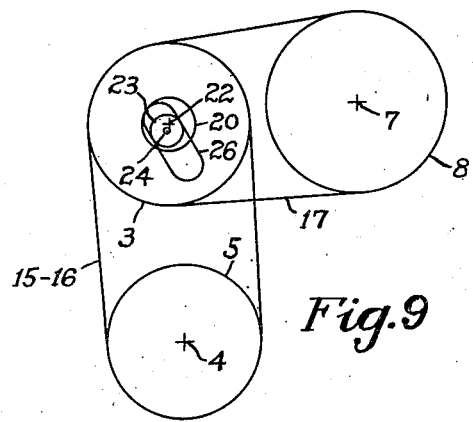
Figure 10:
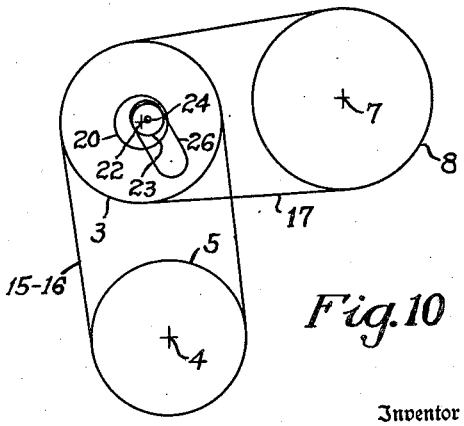

An ordinary two-belt drive is illustrated diagrammatically in Fig. 6 which overcomes the small arc of contact disadvantage of the three-point drive of Fig. 5; but which requires an adjustment in the direction of the arrow 38 to take up belt 39 and an adjustment in the direction of either the arrow 40 or the arrow 41 to take up belt 42.

Various positions of adjustment of the improved fan drive of the present invention are illustrated diagrammatically in Figs. 7, 8, 9 and 10. Thus, progressive positions of the stub shaft 23 upward from near the bottom to near the top of slot 26 are illustrated respectively in Figs. 7, 8, 9 and 10 to take care of stretch or wear of belts 15—16. In each position of adjustment of the stub shaft, indicated by its center 24, the eccentric location of the fan shaft, indicated by its center 22, is different for different lengths of the belt 17 due to stretch or wear. It is to be understood that the particular adjustments shown in Figs. 7, 8, 9 and 10 are not the only adjustments which may be made but are representative of an infinite number of relative adjusted positions of the three shafts.

Accordingly, the present invention provides an improved belt drive for two or more accessories for a large-sized, high-speed internal combustion engine which solves a problem and overcomes difficulties which have existed in the art; which provides a single adjustment requiring minimum movement of one of the shafts connected by two belts, respectively with two other shafts; which single adjustment produces equalized tension upon two belts of a two-belt drive; which belt drive maintains a maximum arc of contact for transmitting the driving load between the belts and pulleys engaged by the belts; in which the adjusting mechanism is of simple design and capable of ready, quick and reliable adjustment; and which avoids the use of collapsible groove pulleys and excessive belt wear caused thereby.

In the foregoing description, certain terms have been used for brevity, clearness and understanding; but no unnecessary limitations are to be implied therefrom beyond the requirements of the prior art, because such words are utilized for descriptive purposes herein and not for the purpose of limitation and are intended to be broadly construed.

Moreover, the embodiment of the improved construction illustrated and described is by way of example, and the scope of the present invention is not limited to the exact details of construction of the various parts.

Having now described the features of the invention, the construction, operation and use of a preferred embodiment of improved fan drive, and the advantageous, new and useful results obtained thereby; the new and useful devices, constructions, arrangements, combination, sub-combinations, parts and elements, and reasonable mechanical equivalents thereof obvious to those skilled in the art, are set forth in the appended claims.

I claim:

1. In drive mechanism for engine accessories having a crankshaft, a fan shaft, a third shaft, drive means connecting the crankshaft and fan shaft, and other drive means connecting the fan shaft and third shaft; for continuously driving the fan shaft and the third shaft during rotation of the crankshaft, an eccentric member on said fan shaft, bracket means, and means slidably and rotatably mounting the eccentric member on said bracket means.

2. In a two-belt drive between a drive shaft and two accessory shafts of an engine in which two belts are connected to a common accessory shaft and each to another shaft; adjustable means mounting the common accessory shaft including an eccentric member, a bracket, means slidably and rotatably mounting the eccentric member on the bracket, and means for slidably moving the eccentric member with respect to the bracket to simultaneously take up for stretch and wear in both belts whereby the pull of the belts rotates the eccentric member automatically to establish a condition of uniform tension in both belts.

3. In drive mechanism for engine accessories having a crankshaft, a fan shaft, a third shaft, pulley means on each of said shafts, belt means connecting the crank and fan shaft pulleys, and other belt means connecting the fan and third shaft pulleys; adjusting mechanism mounting the fan shaft including a stub shaft connected eccentrically with the fan shaft, bracket member means, yoke member means, means slidably and rotatably mounting the stub shaft on one of the members and rotatably mounting the stub shaft on the other member, and means for relatively adjusting said members.

4. In drive mechanism for engine accessories having a crankshaft, a fan shaft, a third shaft, pulley means on each of said shafts, belt means connecting the crank and fan shaft pulleys, and other belt means connecting the fan and third shaft pulleys; adjusting mechanism mounting the fan shaft including a stub shaft connected eccentrically with the fan shaft, a bracket member, a movable yoke member associated with the bracket member, means journaling the stub shaft on the yoke member slidably and rotatably with respect to the bracket, and means for moving the yoke member with respect to the bracket to simultaneously compensate for stretch and wear in both belts whereby the pull of the belts on the fan shaft rotates the eccentric stub shaft to automatically establish a condition of uniform tension in both belts.

5. In drive mechanism for engine accessories having a crankshaft, a fan shaft, a third shaft, pulley means on each of said shafts, belt means connecting the crank and fan shaft pulleys, and other belt means connecting the fan and third shaft pulleys; adjusting mechanism mounting the fan shaft including a stub shaft connected eccentrically with the fan shaft, a bracket member, a movable yoke member associated with the bracket member, means journaling the stub shaft on the yoke member slidably and rotatably with respect to the bracket, means for moving the yoke member with respect to the bracket to simultaneously compensate for stretch and wear in both belts, and means for clamping the stub shaft, bracket and yoke in adjusted position.

6. In drive mechanism for engine accessories having a crankshaft, a fan shaft, a third shaft, pulley means on each of said shafts, belt means connecting the crank and fan shaft pulleys, and other belt means connecting the fan and third shaft pulleys; adjusting mechanism mounting the fan shaft including a bracket, there being a slot formed in the bracket, a movable yoke encompassing the bracket, a stub shaft connected eccentrically with the fan shaft extending through said slot and journaled on the yoke, and means for moving the yoke with respect to the bracket to simultaneously compensate for stretch and wear in both belts.

7. In drive mechanism for engine accessories having a crankshaft, a fan shaft, a third shaft, pulley means on each of said shafts, belt means connecting the crank and fan shaft pulleys, and other belt means connecting the fan and third shaft pulleys; adjusting mechanism mounting the fan shaft including a bracket, there being an elongated slot formed in the bracket extending in a direction at an angle to a plane passing through the axes of the fan and crankshafts and at an angle to another plane passing through the axes of the fan and third shafts, a movable yoke associated with the bracket, a stub shaft connected eccentrically with the fan shaft extending through said slot and journaled on the yoke, and means for moving the yoke with respect to the bracket to simultaneously compensate for stretch and wear in both belts.

8. In a two-belt drive between three shafts having two belts connected to a common shaft and each to a separate shaft; adjusting mechanism for the common shaft including a stub shaft connected eccentrically with the common shaft, bracket member means, yoke member means, means slidably and rotatably mounting the stub shaft on one of the members and rotatably mounting the stub shaft on the other member, and means for relatively adjusting said members, whereby the common shaft and one separate shaft are continuously driven during rotation of the other shaft.

GEORGE W. LA SALLE.

REFERENCES CITED

The following references are of record in the file of this patent:

UNITED STATES PATENTS

| Number | Name | Date |
|---|---|---|
| 1,348,002 | Harroun | July 27, 1920 |
| 1,580,308 | Lawson | Apr. 13, 1926 |
| 1,660,520 | Nielsen et al. | Feb. 28, 1928 |
| 1,978,526 | Eppler, Jr. | Oct. 30, 1934 |
| 2,287,450 | Price | June 23, 1942 |
| 2,479,617 | Hawley et al. | Aug. 23, 1949 |